Sept. 7, 1965  A. H. CALLANDER  3,204,871

PESTICIDE DISPENSING MEANS

Filed Aug. 15, 1963

INVENTOR.
Alexander H. Callander

BY *Clarence R. Patty, Jr.*

ATTORNEY 3,204,871
PESTICIDE DISPENSING MEANS
Alexander H. Callander, Dundee, N.Y., assignor to Corning Glass Works, Corning, N.Y., a corporation of New York
Filed Aug. 15, 1963, Ser. No. 302,402
4 Claims. (Cl. 239—55)

This invention relates to means for dispensing pesticides and more particularly to means for the controlled release of vapor from liquid pesticides.

In order for vaporous pesticides to be effective, it is necessary that the vapors thereof be dispensed into an atmosphere at a rate which is continuously above some minimum value below which the concentration of the pesticide in the ambient atmosphere is insufficient to be lethal of the organisms which it is intended to destroy. In addition, it is necessary that such vapors be emitted sufficiently slowly to avoid rapid exhaustion of the supply thereof, in order to avoid the necessity of frequent renewal of such supply. Also, it is necessary that such vapors be dispensed at a rate which results in an atmospheric concentration which is not injurious to human beings.

For these reasons, in the past there has been a search for satisfactory means for effecting the controlled release of the vapors of liquid pesticides into the atmosphere. In general, previous solutions to the problem presented have involved the permeation of sponge-like materials with liquid pesticides in order to provide reservoirs of the pesticides in the materials, from the surfaces of which the pesticides were allowed to evaporate into the atmosphere. Such means have been found unsatisfactory, since the rate at which a liquid evaporates from a sponge-like material impregnated therewith decreases rapidly as a function of time, thereby requiring frequent renewal of the supply of pesticide in the sponge. The impregnation of wax-like materials with liquid pesticides and the formation of such materials into shapes having high surface areas is a method which has been similarly unsatisfactory.

Accordingly, it is an object of the present invention to provide a means for dispensing the vapors of liquid pesticides at a rate which can be controlled and which is relatively independent of time.

A further object is the provision of such means which are safe in operation, even though there are employed therein chemicals which are injurious to human beings on contact.

These and other objects, which will be apparent from the detailed description of the invention, are accomplished by the provision of a pesticide dispenser comprising in its preferred embodiment a container having walls formed at least in part of porous glass and containing a liquid pesticide capable of permeating the pore structure of the porous glass and vaporizing in the ambient atmosphere.

Figure 1:
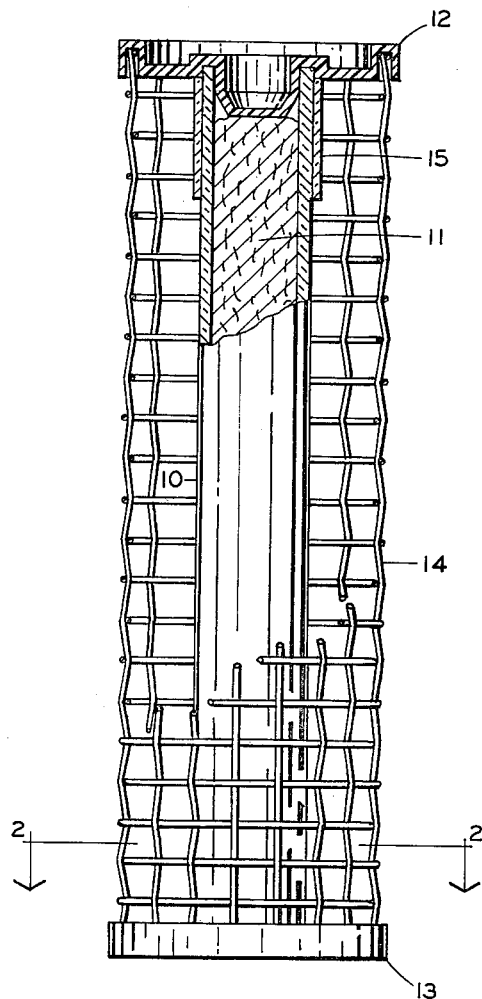
Figure 2:
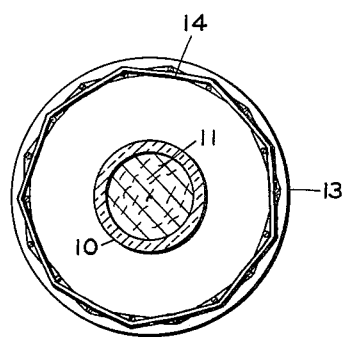

The invention will be described with reference to the accompanying drawings, in which:

FIGURE 1 is a side elevational view, partly in section, of a preferred embodiment of the pesticide dispenser of the invention, and FIGURE 2 is a sectional view taken on line 2—2 of FIGURE 1.

Referring to the drawing, the present device comprises, in its preferred embodiment, hollow porous glass cylinder 10, into which is packed a matrix 11 of glass fibers. Cylinder 10 is closed at each end thereof by means of caps 12 and 13, which also support a protective screen 14.

Porous glass cylinder 10 preferably comprises a glass which contains an intricate network of minute interconnected voids and channels running therethrough. The properties and process of manufacture of such glass are disclosed in United States Patents 2,106,744, and 2,215,039 issued to H. P. Hood and M. E. Nordberg. The process of manufacture disclosed in these patents whereby the void spaces are formed in porous glass comprises generally the step of forming an object of a glass within certain composition ranges, subjecting the glass to heat treatment to separate it into two phases only one of which is soluble, and subsequently dissolving out the soluble phase to produce the void spaces. Among the properties of porous glass which make it particularly suitable as a container for dispensing the vapors of liquid pesticides are its extreme inertness and its small pore diameter, which can be made to vary between approximately 20 and 120 angstrom units. Due to its extremely high surface area, which varies between about 150 to 200 square meters per gram, and due to its high percentage of void space, which comprises about 28 percent of its volume, porous glass has the capacity to absorb water in amounts up to 25% of its dry weight, and other liquids are absorbed in similar amounts.

Porous glass cylinder 10 is filled with glass fiber matrix 11 both in order to prevent the rapid egress of a liquid pesticide from the glass cylinder in the event that the cylinder is fractured and also to act as a wick to distribute the liquid uniformly along the length of the cylinder.

Although the present device may utilize any liquid pesticide capable of vaporizing into an atmosphere, the present device is particularly useful in dispensing a pesticide known as DDVP and sold under the trade name Vapona. This pesticide comprises, O,O-dimethyl O-(2,2-dichlorovinyl) phosphate, and is described in United States Patents 2,956,073 and 2,861,912.

Due to the small pore structure of porous glass, the liquid pesticide contained in the cylinder 10 flows through the walls thereof at a constant rate and vaporizes immediately upon exposure to the ambient atmosphere. At no time does the rate of flow exceed the rate of evaporation, and consequently the surface from which evaporation takes place remains constant, thereby maintaining a constant rate of evaporation of the pesticide into the atmosphere.

Although the porous glass container of the present invention has been illustrated in the form of a cylinder, such container may be formed in other shapes. Regulation of the rate at which the pesticide is released into the atmosphere may be effected by varying the shape of container 10. In addition, by employing containers having greater volume-to-surface ratios than that of cylinder 10, increased effective life of the dispenser may be attained. By choosing as container materials porous glasses having varying pore diameters, or by varying the wall thicknesses of the containers, varying flow rates and varying resultant concentrations of the pesticide vapors in the atmosphere may be obtained.

Container 10 of the present invention has been illustrated as packed with glass fibers for the reasons noted above. Other absorbent materials, for example, cotton or cellulose, may be employed in place of glass fibers, or the present device may be utilized with no packing material whatsoever. In the absence of a packing material within container 10, it will be appreciated that, as the liquid in the container evaporates, the surface area from which evaporation takes place will slowly decrease; however, by utilizing container shapes having large volume-to-surface ratios or by maintaining a reservoir of liquid communicating with the interior of the porous container, such decrease in evaporation rate may be minimized or avoided. One means for effecting a constant rate of evaporation in the absence of an absorbent matrix in the container is illustrated by impervious glass cylinder 15 which contacts the outer surface of the top portion of cylinder 10 and prevents evaporation thereform. Thus, the portion of container 10 within cylinder 15 acts as a reserve supply of liquid pesticide, and even in the absence of an absorbent packing material, the surface area available for evaporation will remain constant as long as the level of the liquid is above the lower extremity of impervious cylinder 15.

Although the precise dimensions of the present pesticide dispensing apparatus will vary acording to the length of time during which it is desired to maintain the effectiveness of the pesticide and the atmospheric concentration of pesticide required, it will be appreciated that preferably the various characteristics of the apparatus are chosen such as that the rate at which the liquid pesticide diffuses through the walls of the porous glass container is not greater than the rate at which such liquid pesticide is capable of evaporating from the outer surface of the container. Thus, the pesticide is prevented from dripping from the outer surface of the container and thereby producing conditions potentially injurious to humans and, in addition, changing the surface area from which evaporation takes place. Since the flow rate of a liquid through porous glass decreases almost linearly with increasing thickness, the rate of evaporation per unit area of container surface may be decreased by either increasing the thickness of the container walls or by decreasing the pore size of the porous glass. The rate at which vapors are emitted from the entire apparatus may be regulated by regulation of these same variables, and, in addition, by regulating the surface area of the container. The exact dimensions required to maintain the desired conditions can be determined by those skilled in the art in accordance with the above considerations.

Although variations may be effected in the structure of the device of the present invention by those skilled in the art, the following specific dimensions of a preferred embodiment of the present apparatus are provided by way of example:

Container 10 may be in the form of a cylinder having an outer diameter of 20.5 millimeters and a wall thickness of 1.2 millimeters. The cylinder may be 8¼ inches long and comprise porous glass having an average pore diameter of 40 angstrom units. Such a device, when filled with the above-described liquid pesticide, will dispense the vapors thereof in sufficient quantities to maintain the atmosphere in an average room lethal to such insects as mosquitos, flies and moths for a period of 200 days.

Inasmuch as the above description has been provided solely as that of a preferred embodiment of the present invention, it is intended that the invention be limited only by the scope of the appended claims, in which the term "porous glass" is used to include all porous glasses described in the previously referred to United States Patents 2,106,744 and 2,215,039.

I claim:

1. Means for dispensing pesticides and similar substances, said means comprising a hollow container having therein a liquid capable of evaporation into the ambient atmosphere, said container comprising at least in part a porous glass body having an inner surface in contact with said liquid and an outer surface exposed to said ambient atmosphere, said porous glass body containing a continuous network of intercommunicating void spaces having diameters within the range approximately 20–120 angstrom units.

2. Means according to claim 1 in which a lower part of said container comprises said porous glass body, and an upper part of said container comprises a portion impervious to said liquid.

3. Means according to claim 2 in which the thickness and pore size of said porous glass body are such as to produce a rate of flow of said liquid through said porous glass body not greater than the rate at which said liquid is capable of evaporating from said outer surface of said porous glass body.

4. Means for dispensing pesticides and similar substances, said means comprising a hollow container having therein a liquid capable of evaporation into the ambient atmosphere, said container comprising at least in part a porous glass body having an inner surface in contact with said liquid and an outer surface exposed to said atomsphere, said container including therein a porous material capable of absorbing said liquid.

References Cited by the Examiner

UNITED STATES PATENTS

| 527,291 | 10/94 | Robinson | 239—44 |
| 1,469,104 | 9/23 | Ornduff | 239—44 |
| 1,725,071 | 8/29 | Gaby | 239—44 X |
| 2,604,893 | 7/52 | Hoipo | 132—40 |
| 3,027,678 | 4/62 | Whitney et al. | 43—125 |

FOREIGN PATENTS 316,618  1931  Great Britain.

LOUIS J. DEMBO, *Primary Examiner.*

EVERETT W. KIRBY, *Examiner.*